W. E. TIENCKEN.
SAFETY PIN.
APPLICATION FILED JUNE 23, 1919.
1,353,093.
Patented Sept. 14, 1920.
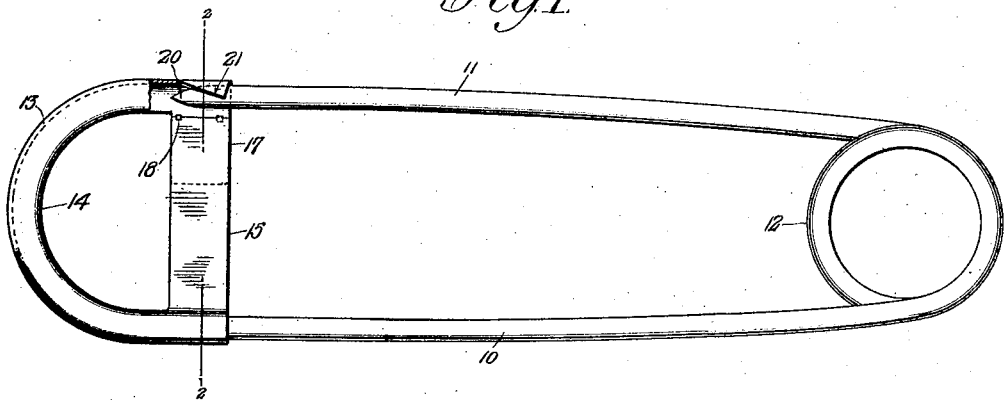
Fig.1.
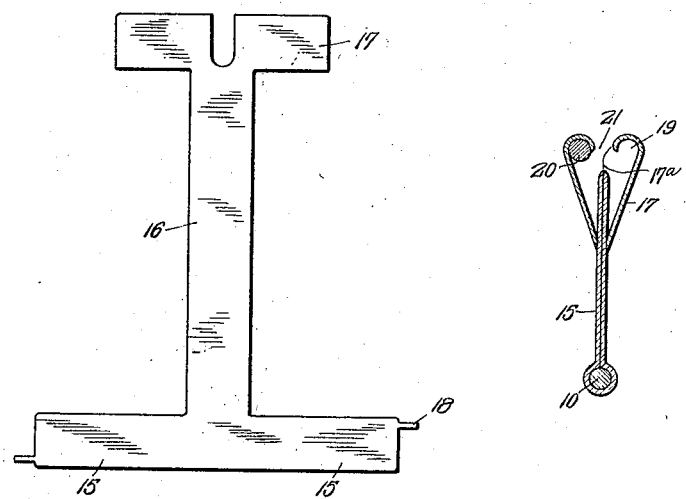
Fig.3.
Fig.2.
Witnesses
JH Crawford
Inventor
W.E.Tiencken,
By Victor J. Evans
Attorney

UNITED STATES PATENT OFFICE.

WILEY E. TIENCKEN, OF MOUNT PLEASANT, SOUTH CAROLINA.

SAFETY-PIN.

1,353,093.   Specification of Letters Patent.   Patented Sept. 14, 1920.

Application filed June 23, 1919. Serial No. 305,985.

*To all whom it may concern:*

Be it known that I, WILEY E. TIENCKEN, a citizen of the United States, residing at Mount Pleasant, in the county of Charleston and State of South Carolina, have invented new and useful Improvements in Safety-Pins, of which the following is a specification.

This invention relates to safety pins designed especially for securing together articles of wearing apparel.

The primary object of the invention is to provide a safety pin constructed in such manner that the pin point will be guided into engagement with the keeper in clasping the pin and also guided from such engagement in unclasping, enabling the pin to be manipulated with one hand.

The invention therefore consists of the novel manner of forming the keeper so as to provide for such guiding and at the same time guard against the accidental disengagement of the pin from the keeper.

With these and other objects in view, the invention consists of the following novel combination and arrangement of parts, hereinafter more fully described and illustrated in the accompanying drawings, in which, Figure 1 is a perspective view of a safety pin constructed in accordance with the present invention.

Fig. 2 is a transverse sectional view of the same on the line 2—2 of Fig. 1.

Fig. 3 is a plan view of the blank from which the keeper is formed.

Referring to the drawings in detail, the invention comprises a safety pin including main members 10 and 11, the former being termed a stationary member and the latter a movable or pointed member. These two members are connected together at one end by a spring coil 12, after the manner of the ordinary form of safety pin.

The opposite end of the stationary member 10 is curved, as shown at 13, and has secured thereon a keeper 14.

This keeper is cut from a single piece of material in the form shown in Fig. 3 and includes oppositely disposed wings 15, formed at one end of a connecting bar 16, the opposite end of this bar being provided with similar wings 17. The wings 15 are formed with lugs 18 which are offset with respect to one another, so that when the keeper is formed and the wing 17 brought together as shown in Fig. 2, each of these lugs may be bent over the opposite wing for the purpose of securing the wings together. The keeper is positioned upon the main members in the manner shown in Fig. 1, by bending the edges of the connecting bar around the curved end 13 of the member 10 and by also bending inwardly the wings 15 over the straight portion of said member. The wings 17 are formed into opposite pockets 19, which are adapted to receive the pointed end 20 of the member 11, this member being positioned within the pockets through a slot 21 formed between the wings 17, the edges of the slot being downwardly curved, as shown at 17ª, thereby forming a seat upon each side of the slot 21 in which the pointed end of the member 11 is adapted to rest.

When it is desired to remove the pointed member from the keeper it is only necessary to press the said member downward, at the same time exerting a lateral pressure, so that when the pointed end 20 reaches the slot 21 it will pass therethrough. In clasping the pin, the member 11 is forced within the slot 21 until it reaches the upper edges of the wings 15, which deflect said member laterally into one of the pockets 19.

When the parts are assembled, the ends of the wings 17 lie within the wings 15, so that practically a solid surface is presented upon each side of the keeper 14, enabling the pointed member to be easily moved thereover until it reaches the slot 21.

Having described the invention, what is claimed is:

1. In a safety pin, the combination with main members, of a keeper rigidly secured to the end of one said members, said keeper comprising oppositely located inwardly extending wing members adapted to be folded together, the inner ends of said wing members being in contacting engagement, one pair of said members forming pockets for the reception of a pointed main member, said pockets being provided with an entrance slot in one side thereof for the passage of the said pointed member.

2. A safety pin comprising main members connected at one end by a resilient element, a keeper rigidly secured to the opposite end of one of said members, said keeper including pockets spaced apart to provide a single entrance to the pocket openings for receiving the other member and means located centrally of said entrance to deflect said member laterally for entrance into one of the pockets.

In testimony whereof I affix my signature.

WILEY E. TIENCKEN.